United States Patent
Peled et al.

[11] Patent Number: 6,028,156
[45] Date of Patent: Feb. 22, 2000

[54] PROCESS FOR THE PREPARATION OF POLY-(HALOBENZYL ACRYLATE)

[75] Inventors: Michael Peled, Beer-Sheva; Nurit Kornberg, Lehavim, both of Israel

[73] Assignee: Bromine Compounds, Ltd., Beer-Sheva, Israel

[21] Appl. No.: 08/585,837

[22] Filed: Jan. 16, 1996

[51] Int. Cl.$^7$ ....................................................... C08F 2/06
[52] U.S. Cl. ........................ 526/292.5; 526/208; 526/209
[58] Field of Search ................................. 526/292.5, 208, 526/209

[56] References Cited

U.S. PATENT DOCUMENTS

| | | | |
|---|---|---|---|
| 4,059,618 | 11/1977 | Blummenfeld et al. | 560/221 |
| 4,128,709 | 12/1978 | Vollkommer et al. | 526/218 |

FOREIGN PATENT DOCUMENTS 62-010109  1/1987  Japan .

*Primary Examiner*—Bernard Lipman
*Attorney, Agent, or Firm*—Michael N. Meller; Eugene Lieberstein

[57] ABSTRACT

A process for the preparation of thermally stable polymers of the formula I:

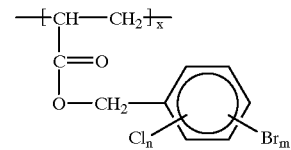

wherein n+m=1 through 5, and x denotes the degree of polymerization, comprises polymerizing monomers of the formula Ia:

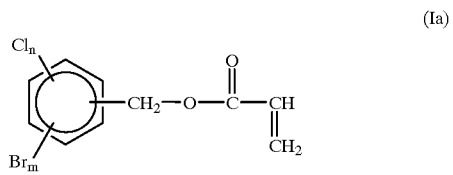

wherein n+m=1 through 5, in a non-protic solvent.

13 Claims, No Drawings

PROCESS FOR THE PREPARATION OF POLY-(HALOBENZYL ACRYLATE)

FIELD OF THE INVENTION

The invention relates to a process for the preparation of polymers having the general formula:

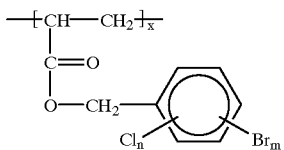

(I)

wherein n+m=1 through 5, and x denotes the degree of polymerization.

BACKGROUND OF THE INVENTION

Polymerization processes which are based on unsaturated esters are well documented in the art. Controlling the polymer's physical properties, such as thermal stability, is a complicated task, because physical properties are affected by several parameters which are not always recognized or simple to handle.

The invention, as said, is concerned with the preparation of polymers of Formula I. Production of the monomeric unit is, of course, the first step in the polymerization process. IL 89791 discloses a process for the preparation of bromo-substituted aromatic esters of certain α,β-unsaturated acids. GB 1,516,212 discloses a procedure for preparing unsaturated esters, which may later serve as reactive monomers for polymeric materials. One Example of such an unsaturated ester is pentabromobenzyl acrylate (PBB-MA), obtained by reacting, according to the procedure given in GB 1,516,212, pentabromobenzyl chloride with an alkali metal salt of α,β-unsaturated acid, in particular, an acrylic acid. This process is carried out in a protic solvent (methoxyethanol). Direct polymerization, when performed according to a procedure disclosed in the art (GB 1,547,839) yields a polymer, poly(pentabromobenzyl acrylate), the thermal stability of which is limited. The Isothermal Gravimetric Analysis (ITGA 290° C./30 min) parameter of the aforementioned polymer is of the order of 35%–50% weight loss.

It is a purpose of the present invention to provide a process for the preparation of polymers of Formula I, characterized by an improved thermal stability.

It is another object of the invention to provide polymers which exhibit high thermal stability.

It is a further object of the invention to provide a one-pot process, in which the polymeric product is obtained from the monomeric unit of formula Ia:

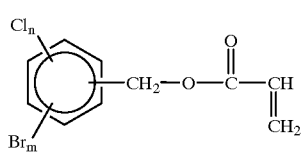

(Ia)

wherein n+m=1 through 5, which is made in situ from a compound of the following formula:

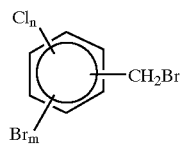

(II)

wherein n+m=1 through 5.

It is yet another object of the invention to provide a one-pot process, in which the polymeric product is obtained from the monomeric unit which is made from a compound of Formula II. The compound of formula II, in turn, is prepared in situ from a compound of formula (III):

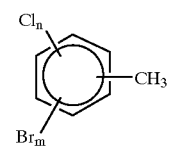

(III)

wherein n+m=1 through 5.

Other objects of the invention will become apparent as the description proceeds.

SUMMARY OF THE INVENTION

As explained above, the inventors have surprisingly found that it is possible to prepare polymers of formula I, which exhibit substantially improved thermal stability, by carrying out the polymerization reaction in a non-protic solvent. The term non-protic solvents refers to aprotic solvents (=solvents that are not capable of proton transfer in water or methanol) and to aliphatic solvents. The improvement is dramatic, as the ITGA of the final product is 4–10 times better (lower) than that which is obtained according to the prior art, when the polymer is produced in a protic solvent.

As will be apparent to the skilled chemist from the description to follow, the invention provides the further advantage of permitting to carry out a one-pot process, in which the monomeric units which make up the polymer of Formula I, are prepared in situ. The process for the preparation of the thermally stable polymers according to the invention comprises polymerizing the monomeric units of formula Ia in a non-protic solvent.

DETAILED DESCRIPTION OF THE INVENTION

As stated, the invention comprises a polymerization reaction which is carried out in an a non-protic solvent. According to one preferred embodiment of the invention, the non-protic solvent may be an aprotic solvent of any suitable type, e.g., a ketone, or an ether. According to another preferred embodiment of the invention the non-protic solvent may be an aliphatic solvent. Illustrative but non limitative examples of suitable solvents include cyclohexane, diethylenglycol dimethylether, ethylenglycol dimethylether, 2-butanone (MEK), 4-methyl-2-pentanone (MIBK) and p-dioxane. Other suitable non-protic solvents will be easily recognized by the skilled chemist.

According to one possible embodiment of the invention, the polymerization of the monomers of Formula Ia is carried out in the presence of a polymerization initiator. Examples of suitable initiators are benzoyl peroxide and dicumyl peroxide. According to another preferred embodiment of the invention, the polymerization process can also be carried out without the presence of an initiator.

The reaction temperature varies according to the solvent and reagents employed. Generally, the polymerization can be conveniently carried out in the temperature range of 70° C.–120° C., although other temperatures can be employed.

According to a preferred embodiment of the invention the monomer of Formula Ia, is produced in situ, by esterifying a compound of Formula II with acrylic acid or a salt thereof. According to another preferred embodiment of the invention, the compound of Formula II is also made in situ by brominating a compound of Formula III.

A polymer of particular interest is polypentabromobenzyl acrylate (PBB-PA). This polymer is produced, according to a preferred embodiment of the invention, by polymerizing, in a non-protic solvent, pentabromobenzyl acrylate (PBB-MA) which can be obtained in situ by esterifying pentabromobenzyl bromide (PBB-Br), which, in turn, can be made in situ by bromination of pentabromotoluene (5BT). Of Course, both PBB-MA and PBB-Br can be used also if they have not been made in situ, although it will be appreciated that, under many circumstances, in situ intermediate production can be industrially useful and desirable.

The invention also encompasses polymers, the monomeric unit of which is given in Formula Ia, of high thermal stability, which are characterized by an ITGA (290° C., 30 min) of less than 34% weight loss.

All the above and other characteristics and advantages of the invention will be better understood through the following illustrative and non-limitative description of preferred embodiments thereof.

EXPERIMENTAL APPARATUS

1) In a Thermal Gravimetric Analysis apparatus (Mettler TC10A+TG50) the sample is heated from room temperature to 290° C. at a rate of 50° C./min. than the sample is kept at temperature of 290° C. for 30 min, all under a nitrogen stream. The ITGA parameter, which defines the weight loss of the sample (in percents) under the above conditions, was then measured.

2) GPC apparatus (Waters 150 C.), with refractive index detector of Waters, differential viscometric detector of Viscotec, and column of Plgel (Polym. Lab. 5$\mu$ and 10$\mu$) was used for the determination of molecular weight.

EXAMPLE 1 (Comparative)

Esterification of PBB-Br to PBB-MA and Polymerization of PBB-MA to PBB-PA in methoxyethanol PBB-MA was prepared according to the procedure described in GB 1,516,212, but using PBB-Br instead of PBB-CL. The following procedure was used: 1000 ml 4-necked jacketed reactor equipped with a digital reading mechanical stirrer, a condenser, a thermocouple probe and a gas inlet tube was charged with 257 g (267 ml) 2-methoxyethanol, 25.23 g (0.350 mole) distilled acrylic acid and 0.667 g hydroquinone. With slow stirring the contents are degassed. $Na_2CO_3$ 17.75 g (0.1675 mole) is added in small portions through a solid addition funnel with rapid stirring. Because the temperature begins to rise, the contents are cooled to 20° C. by a cooling oil bath. The nitrogen source is closed, so that bubbling reflects only $CO_2$ evolution. About 30 minutes are needed to complete the evolution of $CO_2$ from the beginning of addition. The nitrogen stream is then resumed, and PBB-Br 189 g (0.333 mole) is added over a period of 5 minutes. The flasks content is brought 110° C. and kept at this temperature for 3.5 hours with a stirring rate of 600–700 rpm. Another 333 ml 2-methoxyethanol are then added under a swift stream of nitrogen, followed by 3.33 g dicumyl peroxide. The internal temperature is raised to 120° C. and the reactor contents are maintained at this temperature with stirring (350 rpm) for 15 hr. After cooling the flasks content the resulting polymer product is removed from the reactor, washed with 2-methoxyethanol and then with water, and dried to constant weight at 120° C./5 torr. Reaction conditions and results are shown in Table I.

TABLE I

| Exp. No. | Mole Acrylic Acid | Mole Sodium Carbonate | Mole PBB-Br | Acid mole % | Excess salt mole % | % Yield |
|---|---|---|---|---|---|---|
| 1 | 0.350 | 0.335 | 0.333 | 4.50 | 0.60 | 74.2 |
| 2 | 0.350 | 0.335 | 0.333 | 4.50 | 0.60 | 74.6 |
| 3 | 0.350 | 0.335 | 0.334 | 4.49 | 0.30 | 98.8 |
| 4 | 0.350 | 0.335 | 0.334 | 4.49 | 0.30 | 90.2 |
| 5 | 0.383 | 0.366 | 0.334 | 5.09 | 9.53 | 85.0 |
| 6 | 0.395 | 0.376 | 0.334 | 5.69 | 12.57 | 82.8 |

| Exp. No. | Esterfication/ Polymerization parameters [time (h) and temperature (deg° C.)] | LOD % | m.s. (deg C) | % Residual monomer | ITGA 290° C/ 30 min (% weight loss) | Mw ×10$^5$ | Mn ×10$^3$ | Mz ×10$^5$ |
|---|---|---|---|---|---|---|---|---|
| 1 | 3.5 h, 110 C/ 15 h, 120 C | nd | 200 | 13.2 | 34.1 | | | |
| 2 | 3.5 h, 110 C/ 15 h, 120 C | nd | 186 | 14.6 | 40.8 | | | |
| 3 | 3.5 h, 110 C/ 15 h, 119 C | 1.46 | 197 | <2.0 | 78.26 | 1.28 | 7.92 | 3.98 |
| 4 | 3.5 h, 110 C/ 15 h, 119 C | 1.70 | 199 | <2.0 | 45.29 | 0.714 | 2.01 | 3.09 |
| 5 | 0.5 h, 110 C/ 12 h, 120 C | 0.38 | 207 | <2.0 | 38.3 | 0.857 | 1.85 | 2.38 |
| 6 | 0.166 h, 110 C/ 15 h, 119 C | 0.55 | 210 | <2.0 | 59.18 | 1.08 | 5.07 | 5.19 | m.s.:temperature at which melting starts
nd:not determined

EXAMPLE 2

Polymerization of PBB-MA in MEK

A 500 ml 4-necked jacketed reactor equipped with a digital reading mechanical stirrer, a condenser, a thermocouple probe and a gas inlet tube was charged with 20 g PBB-MA and 350 ml MEK. The contents are degassed at room temperature with a stream of nitrogen at low stirring rate (200 rpm) for at least 30 min. The contents of the reactor are heated to 75° C. and 0.20 g of benzoyl peroxide are added under a swift stream of nitrogen. After stirring (500 rpm) three hours at 75° C. another 0.20 g of benzoyl peroxide are added and the reaction is continued for another three hours. After cooling to room temperature the solid is filtered, washed with toluene, with methanol and dried to constant weight at 120° C./50 torr. Yield of dry polymer 75% by weight. Reaction parameters and product characteristics are summarized in Table II below:

TABLE II

| PBB-MA (mol/l) | Temp (°C.) | Time (hr) | Yield (%) | Tg (°C.) | ITGA 290° C./ 30 min (% weight loss) | Mw ×10$^4$ | Mn ×10$^3$ |
| --- | --- | --- | --- | --- | --- | --- | --- |
| 0.1 | 75 | 6 | 75 | 164 | 14.5 | 15.5 | 8.9 |

EXAMPLE 3

Polymerization of PBB-MA in MIBK

A 500 ml 4-necked jacketed reactor equipped with a digital reading mechanical stirrer, a condenser, a thermocouple probe and a gas inlet tube was charged with 20 g PBB-MA and 350 ml MIBK. The contents were degassed at room temperature with a stream of nitrogen at low stirring rate (200 rpm) for at least 30 min. The contents of the reactor were heated to 110° C. and 0.20 g of dicumyl peroxide were added under a swift stream of nitrogen. After stirring (500 rpm) three hours at 110° C. another 0.20 g of dicumyl peroxide were added and the reaction was continued for another three hours. After cooling to room temperature the solid was filtered, washed with toluene, with methanol and dried to constant weight at 120° C./50 torr. The product was obtained in 80% yield and its ITGA parameter was 12.1% weight loss.

EXAMPLE 4

Esterification of PBB-Br to PBB-MA and Polymerization of PBB-MA to PBB-PA (one pot) in MEK In a reactor as described in Example 2 above were placed 100 ml MEK (with a water content of 10 w %), and 3.35 g (83.75 mmol) NaOH. 6.19 g (86 mmol) acrylic acid were added dropwise with slow stirring and a mild increase in temperature. A slurry of sodium acrylate in MEK was obtained. 46.2 g of PBB-Br (81.6 mmole) were added while stirring at 400 rpm. After 2 hours the condensation was completed, 0.14 g of dicumyl peroxide were added and the temperature was raised to reflux temperature for 3 hours. The resulting polymer was obtained as a slurry in the solvent. After workup and drying a yield of 80% was obtained. The ITGA value was 6.3% weight loss (290° C./30 min).

EXAMPLE 5

Preparation of PBB-Br from 5BT and Esterification of PBB-Br to PBB-MA in Chlorobenzene, and Polymerization of PBB-MA to PBB-PA in MEK In a 2 l three-necked flask equipped with thermometer, mechanical stirrer and condenser, were placed 250 g (0.51 mole) pentabromotoluene (5BT), 500 ml chlorobenzene, 80 ml water, 100 g (0.63 mole) bromine and 2.7 g 2,2'-azobis (isobutyromtrile) (AIBN). The mixture was heated to 75° C. for 5 hours. When the PBB-Br content reached more than 99% (area by GC) the reaction mixture was cooled to 50° C. and 37% NaHSO$_3$ was added slowly to destroy excess bromine. Aqueous NaOH solution was added to neutralize the reaction mixture and the aqueous, upper layer was separated. A Dean Stark distillation head was connected to the flask and the mixture was heated to 90° C. Residual water was distilled until less than 500 ppm of water were left. The flask contents were cooled to room temperature and anhydrous K$_2$CO$_3$, 47 g (0.34 mole), tetrabutylammonium bromide (TBAB) 4.1 g and 48% NaOH solution, 5.8 ml were added. Acrylic acid, 47.7 g (0.66 mole), was added slowly from a dropping funnel to prevent foaming and exotherm. When addition was completed the mixture was heated to 70° C. with vigorous stirring for 3 hours, until the reaction was completed according to GC analysis. The organic layer was washed with water to remove KBr and NaBr and the organic layer was cooled to permit crystallization of PBB-MA. Temperature at which melting of the product started was determined to be 122° C., while GC analysis showed 99% (by area) of PBB-MA. The PBB-MA was now used, as according to Example 2, for production of PBB-PA. ITGA value of the polymer was 14.5% weight loss.

EXAMPLE 6

Polymerization of PBB-MA in Cyclohexane

Example 2 was repeated, but MEK was replaced by cyclohexane and the reaction temperature was raised to 81° C. Reaction parameters and product characteristics are summarized in Table III:

TABLE III

| PBB-MA (mol/l) | Temp (°C.) | Time (hr) | Yield (%) | Tg (°C.) | ITGA 290° C./ 30 min (% weight loss) | Mw ×10$^4$ | Mn ×10$^3$ |
| --- | --- | --- | --- | --- | --- | --- | --- |
| 0.08 | 81 | 7 | 80 | 165 | 5 | 4.8 | 9.3 |
| 0.08 | 81 | 7 | 80 | 166 | 8.7 | n.a. | n.a. | n.a:not available

EXAMPLE 7

Polymerization of PBB-MA in Diethylenglycol Dimethylether

Example 2 was repeated, but MEK was replaced by diethylenglycol dimethylether and the reaction temperature was raised to 80° C. Reaction parameters and product characteristics are summarized in Table IV:

TABLE IV

| PBB-MA (mol/l) | Temp (°C.) | Time (hr) | Yield (%) | Tg (°C.) | ITGA 290° C./ 30 min (% weight loss) | Mw ×10$^4$ | Mn ×10$^3$ |
| --- | --- | --- | --- | --- | --- | --- | --- |
| 0.04 | 80 | 7 | 5 | 159 | 4.6 | 11.6 | 4.6 |

EXAMPLE 8

Polymerization of PBB-MA in Ethylenglycol Dimethylether

Example 2 was repeated, but MEK was replaced by ethyleneglycol dimethylether, and reaction temperature was raised to 70° C. Reaction parameters and product characteristics are summarized in Table V:

TABLE V

| PBB-MA (mol/l) | Temp (°C.) | Time (hr) | Yield (%) | Tg (°C.) | ITGA 290° C./ 30 min % weight loss) | Mw ×10$^4$ | Mn ×10$^3$ |
|---|---|---|---|---|---|---|---|
| 0.04 | 70 | 8 | 34 | 164 | 33.5 | 0.34 | 1.7 |

EXAMPLE 9

Polymerization of PBB-MA in p-Dioxane

Example 2 was repeated, but MEK was replaced by p-dioxane and the reaction temperature was raised to 70° C. Reaction parameters and product characteristics are summarized in Table VI:

TABLE VI

| PBB-MA (mol/l) | Temp (°C.) | Time (hr) | Yield (%) | Tg (°C.) | ITGA 290° C./ 30 min (% weight loss) | Mw ×10$^4$ | Mn ×10$^3$ |
|---|---|---|---|---|---|---|---|
| 0.36 | 70 | 8 | 50 | 99 | 12.3 | 0.43 | 3.5 |
| 0.11 | 70 | 8 | 32 | 156 | 14.3 | 1.16 | 6.6 |

EXAMPLE 10

Preparation of Poly-(2,4-dichloro-tribromobenzyl) acrylate from 2,4-dichloro-tribromobenzyl acrylate in MIBK 5 g of 2,4-dichloro-tribromobenzyl acrylate (m.p. 89° C.–92° C., % Br=51.54, % Cl=14.9) were dissolved in 20 ml MIBK and polymerized as described in Example 4. Yield of dry polymer was 72% by weight ITGA value (290° C./30 min) was 6.1% weight loss.

EXAMPLE 11

Preparation of Poly-(2-chloro-tetrabromobenzyl) acrylate from 2-chloro-tetrabromobenzyl acrylate in MIBK 5 g of 2-chloro-tetrabromobenzyl acrylate (m.p. 103° C.–107° C., % Br=59.72, % Cl=6.62) were dissolved in 20 ml MIBK and polymerized as described in Example 4. ITGA value (290° C./30 min) was 8.8% weight loss.

EXAMPLE 12

Preparation of Poly-(4-chloro-tetrabromobenzyl) acrylate from 4-chloro-tetrabromobenzyl acrylate in MIBK 5 g of 4-chloro-tetrabromobenzyl acrylate (m.p. 95° C.–99° C., % Br=59.98, % Cl=6.56) were dissolved in 20 ml MIBK and polymerized as described in Example 4. ITGA value (290° C./30 min) was 6.9% weight loss.

All the above description and examples have been provided for the purpose of illustration, and are not intended to limit the invention in any way. Many modifications can be effected in the process: for instance, different solvents and reaction temperatures can be used, or different polymerization initiators can be applied, and different polymers can be prepared from different monomers, all without exceeding the scope of the invention.

We claim:

1. A process for the preparation of thermally stable polymers of the formula I:

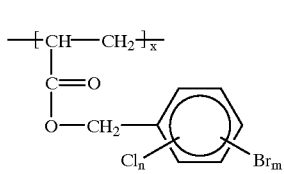

(I)

wherein n+m=1 through 5, and x denotes the degree of polymerization, comprising polymerizing a monomer of the formula Ia,

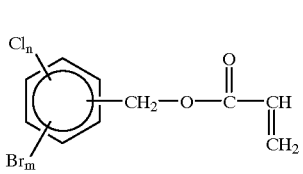

(Ia)

wherein n+m=1 through 5, in an aprotic solvent provided that the aprotic solvent is not benzene.

2. A process according to claim 1, wherein the aprotic solvent is an aliphatic solvent.

3. A process according to claim 2, wherein the aliphatic solvent is cyclohexane.

4. A process according to claim 1, wherein the polymerization reaction is carried out in the presence of a polymerization initiator.

5. A process according to claim 1, wherein the polymerization reaction is carried out essentially in the absence of an initiator.

6. A process according to claim 4, wherein the polymerization initiator is benzoyl peroxide or dicumyl peroxide.

7. A process according to claim 1, wherein polymerization is carried out at temperature between about 70° C.–120° C.

8. A process according to claim 1, wherein the monomer is selected from the group consisting of pentabromobenzyl acrylate, 2-chloro-tetrabromobenzyl acrylate, 4-chloro-tetrabromobenzyl acrylate and 2,4-dichloro-tribromobenzyl acrylate.

9. A process according to claim 1 wherein the monomer is produced in situ by esterifying acrylic acid or a salt thereof with

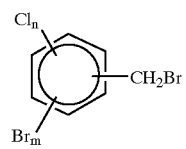

(II)

wherein n+m=1 through 5.

10. A process according to claim 9, wherein the compound of Formula II is produced in situ by brominating a compound of the formula

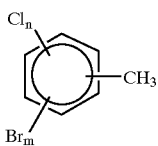 (III)

wherein n+m=1 through 5.

11. A process according to claim 10, wherein the compound of Formula III is pentabromotoluene (5BT) and the compound of Formula II is pentabromobenzyl bromide.

12. A process for the preparation of thermally stable polymers of the formula I:

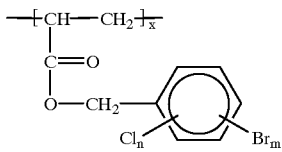 (I)

wherein n+m=1 through 5, and x denotes the degree of polymerization, comprising polymerizing a monomer of the formula Ia,

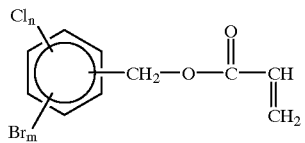 (Ia)

wherein n+m=1 through 5, in an aprotic solvent, wherein the aprotic solvent is a ketone or an ether.

13. A process for the preparation of thermally stable polymers of the formula I:

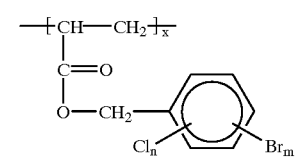 (I)

wherein n+m=1 through 5, and x denotes the degree of polymerization, comprising polymerizing a monomer of the formula Ia,

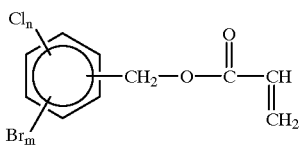 (Ia)

wherein n+m=1 through 5, in an aprotic solvent, wherein the aprotic solvent is selected from the group consisting of diethyleneglycol dimethylether, ethyleneglycol dimethylether, 2-butanone (MEK), 4-methyl-2-pentanone (MIBK) and p-dioxan.

* * * * *